United States Patent [19]

Matsumoto

[11] Patent Number: 4,769,677
[45] Date of Patent: Sep. 6, 1988

[54] PHOTOMETERING METHOD IN PHOTOGRAPHIC PRINTER

[75] Inventor: Fumio Matsumoto, Tokyo, Japan

[73] Assignee: Fuji Photo Film Co., Ltd., Kanagawa, Japan

[21] Appl. No.: 37,783

[22] Filed: Apr. 13, 1987

[30] Foreign Application Priority Data

Apr. 18, 1986 [JP] Japan .................................. 61-89252

[51] Int. Cl.⁴ ............................................. G03B 27/80
[52] U.S. Cl. .......................................... 355/38; 355/68
[58] Field of Search ............... 355/38, 68; 358/213.15, 358/213.28, 214, 213.13

[56] References Cited

U.S. PATENT DOCUMENTS

| | | | |
|---|---|---|---|
| 4,471,228 | 9/1984 | Nishizawa et al. | 358/213.28 X |
| 4,596,459 | 6/1986 | Tahara et al. | 355/38 |
| 4,667,245 | 5/1987 | Matsumoto et al. | 358/214 |
| 4,668,082 | 5/1987 | Terashita et al. | 355/38 X |
| 4,692,794 | 9/1987 | Suzuki | 355/38 X |

Primary Examiner—L. T. Hix
Assistant Examiner—D. Rutledge
Attorney, Agent, or Firm—Wenderoth, Lind & Ponack

[57] ABSTRACT

A photometering method in a photographic printer where color balance and density are adjusted by a color compensation filter and where a photoprint may be made by irradiating light on an original film through a mirror box, including the steps of: setting the color compensation filter to a photometering position so as to allow the light quantity per unit area of an image information detector including an image sensor to be within a predetermined area, photometering the original film with the image information detector, and then setting the color compensation filter to an exposure position for automatic photoprinting.

7 Claims, 3 Drawing Sheets

PHOTOMETERING METHOD IN PHOTOGRAPHIC PRINTER

BACKGROUND OF THE INVENTION

This invention relates to a photometering method in a photographic printer which is carried out by adjusting color balance and density by means of a color compensation filter, and irradiating a light on an original film through a mirror box for photoprinting.

As shown in FIG. 1, a photographic printer including a color compensation filter is so arranged that a film negative 2 on a film negative carrier 9 which is conveyed to a printing section is subjected to light from a light source 4 by the color compensation filter 3 consisting of three complementary color filters for yellow (Y), magenta (M) and cyan (C) and by a mirror box 1 whereas a transmitted light from the film negative 2 passes through a lens unit 5 and a black shutter 6 to a photographic paper 7. The photographic paper 7 is wound on a supply reel 7A and taken up on a take up reel 7B with simultaneous conveyance and stoppage thereof. Photosensors 8, such as photo diodes or the like for detecting image density information on the three primary colors such as red, green and blue are located adjacent to the side of the lens unit 5 for the film negative 2. The photographic printer as disclosed in Japanese Laid-open patent application No. 154244/1985 includes an image information detecting apparatus 10 composed of a two-dimensional image sensor 11 tilted toward an optical axis LS extending from the light source 4 and the film negative 2. This image information detecting apparatus 10 carries a lens unit 12 for forming the image with the approximate center of the film negative 2 as the optical axis. The detector is provided at its rear with a base plate 13 for mounting a processing circuit consisting of ICs and the like for the purpose of image processing. Normally, the photosensors 8 or the image information detecting apparatus 10 is adapted to detect image information on the film negative 2 to effect photoprinting by utilizing the optimum exposure amount suitable for the film negative in question.

However, a photographic printer of this class must have its mirror box 1 changed in accordance with the size of the film negative 2 being used and this means that the light quantity per unit area of the film negative 2 varies greatly. This in turn results in a considerable variation in the light quantity of an elementary image unit which is focused to form an image on the photometering image sensor 11 or which is condensed into the photosensors 8. Specifically, the image sensor normally covers a dynamic range which is too small to be practical, say about 1:100, so that the output amounts to a noise level (dark current) or a saturated level reverse thereto when the light quantity which is to be a reference for image information detection is noticeably changed, thereby to causing a difficulty in obtaining accurate detection of image information. In order to perform an effective printing operation by setting the printing and exposure time within a predetermined range even if the size of the film negative is varied, it is necessary to remove the mirror box 1 for the light source 4 and exchange it for another in accordance with the size of the film negative.

Generally speaking, the size combinations for the film negative and the mirror box 1 are as follows:

120 size→120 mirror box 135F, 135H, 126 size→135/126 mirror box 110 size, disc film→110/disc mirror box Now the, difference in light quantity per unit area of the film negative between a 120 mirror box and a 110/disc mirror box is more than 10-fold. For this reason, the dynamic range is decreased and there is difficulty in obtaining accurate image information detection when light is measured by the image sensor. This should be overcome at all costs.

Proposals for a remedy of this problem have been made wherein an auto iris or an ND (neutral density) filter adjusting mechanism is mounted in an image forming optical system for an image sensor. This provides a disadvantage, however, in that some difficulty is involved in adjustment of the sensitivity of each of the colors such as red, green and blue and in that the auto iris is expensive and complicated in structure and the ND filter adjusting mechanism fractionates light too continuously for it to be adjusted.

SUMMARY OF THE INVENTION

This invention is provided in view of what is discussed above, and it is an object of the invention to provide a photometering method which comprises setting a color compensation filter for photoprinting exposure control in a photometering position, and automatically limiting within a predetermined range the light quantity per unit area of an image information detecting means such as an image sensor and a photosensor.

According to one aspect of this invention, for achieving the objects described above, there is provided a photometering method in a photographic printer wherein color balance and density are adjusted by means of a color compensation filter and wherein a photoprint may be made by irradiating light on an original film through a mirror box, characterized by setting said color compensation color filter to a photometering position such as to allow the light quantity per unit area of an image information detecting means to be within a predetermined area, photometering said original film by means of said image information detecting means, and then setting said color compensation filter to an exposure position for automatic photoprinting.

The nature, principle and utility of the invention will become more apparent from the following detailed description when read in conjunction with the accompanying drawings.

DESCRIPTION OF THE PREFERRED EMBODIMENTS

Figure 1:
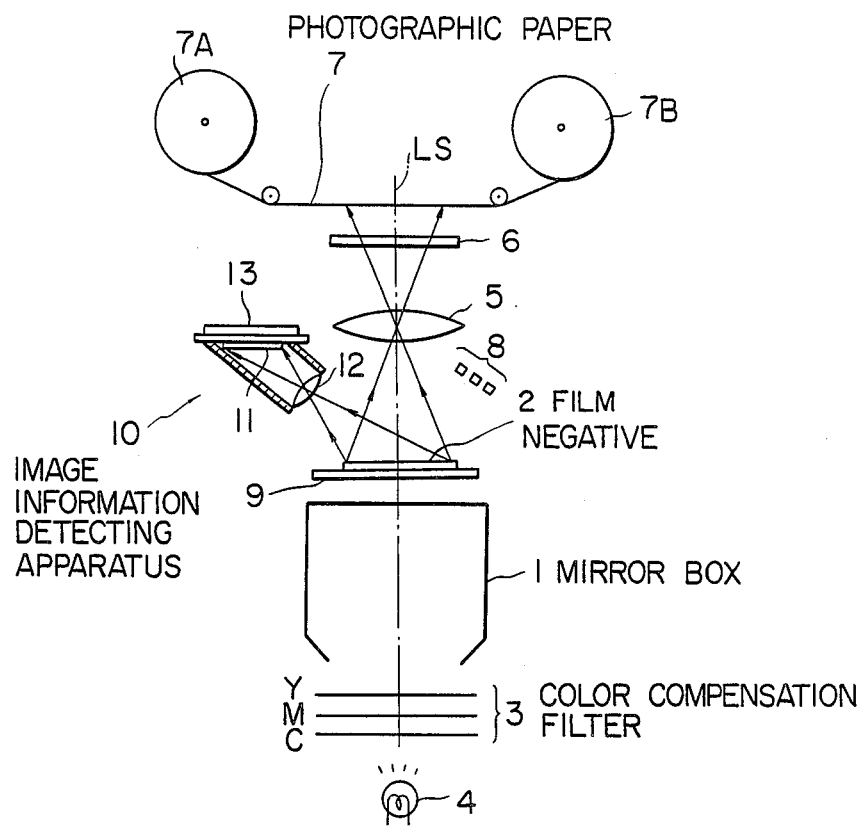
FIG. 1 is a schematic block diagram of a photographic printer in which the present invention may be embodied.
Figure 2:
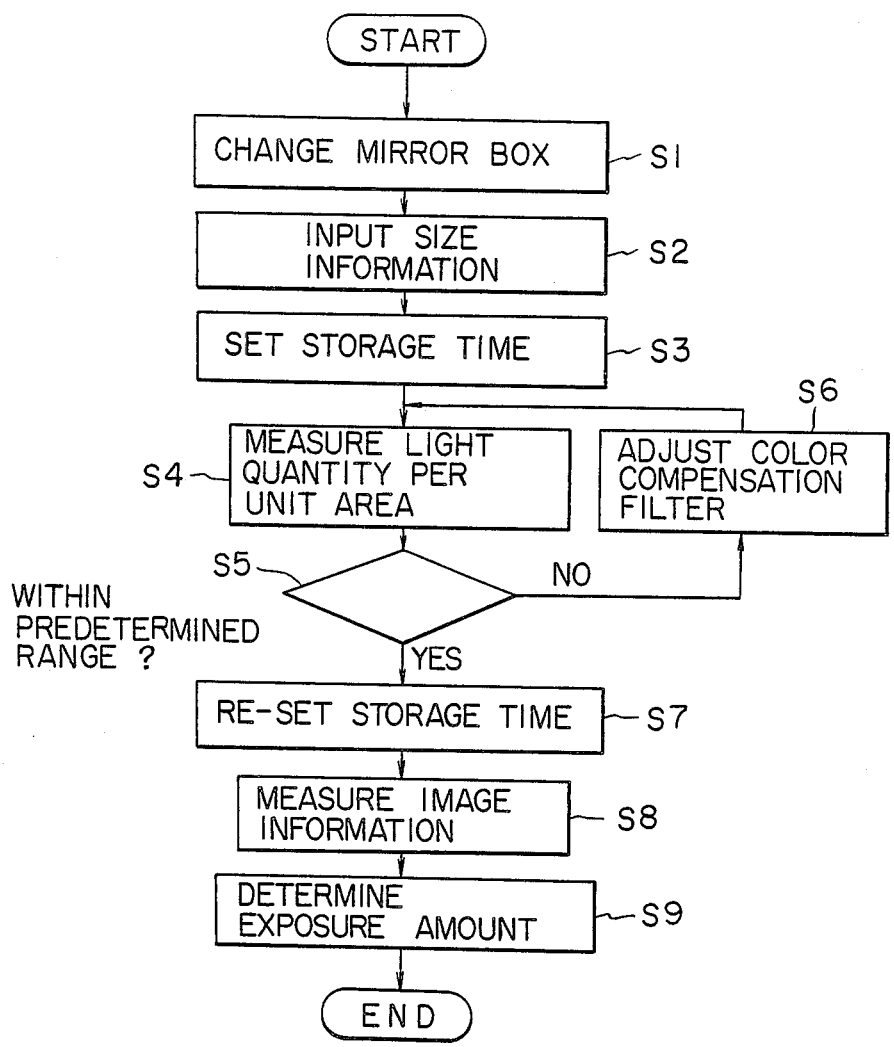
FIG. 2 is a flow chart for the purpose of illustrating the manner in which the present invention is carried out.

According to the present invention, luminous intensity may be measured in accordance with the flow shown in FIG. 2 by use of the photographic printer illustrated in FIG. 1. More specifically, as the operation of changing and setting the size of a film negative 2 is performed, the mirror box is changed to another (Step S1) which conforms with the size of the film negative 2, and then information on the size is inputted (Step S2) by a manual operation or by means of an image information detecting apparatus 10 as shown in Japanese Laid-open patent application No. 151620/1985. When the image sensor 11 is employed, the storage time required for photoelectric conversion is set to a predetermined value (Step S3), and the light quantity per unit area (for instance, per one picture element) is optically measured (Step S4) to determine whether or not the measured value is within a predetermined range (Step S5). If the measured value is beyond the predetermined range, the extent to which color compensation filter 3 is to be inserted into the optical path is adjusted such as to adjust the light quantity (Step S5). Adjustment of the compensation filter 3 is repeated in such a manner that the light quantity per unit area is measured to allow the light quantity per one picture element to fall within a predetermined range. In this connection, it is noted that for color adjustment, the respective color compensation filters for cyan, magenta and yellow are independently adjusted in response to the sensitivity to red, green and blue whereas for density adjustment, the color compensation filters are adjusted at the same ratio. A predetermined voltge is drained to photosensors 8 to make the same adjustment.

Figure 3:
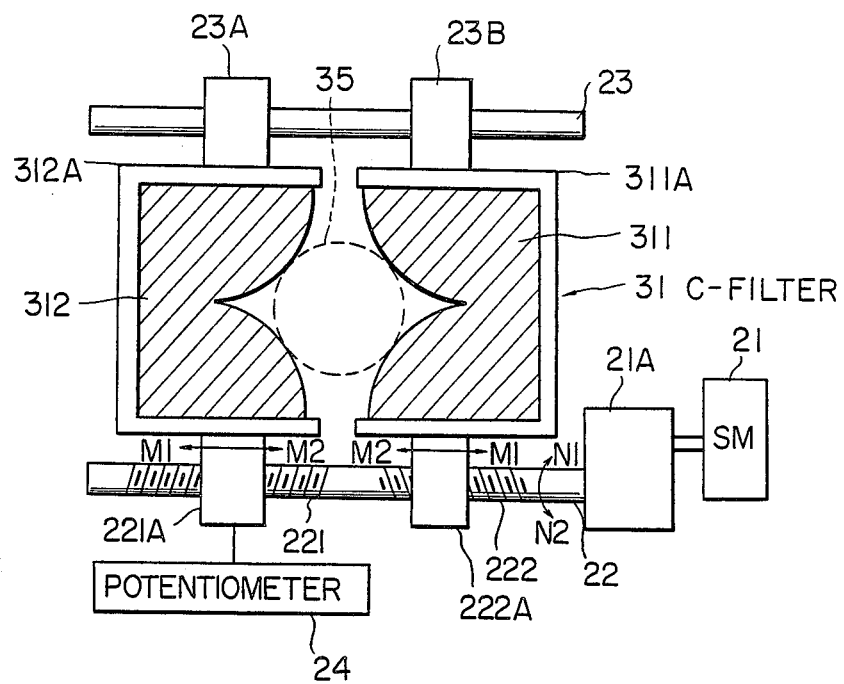
FIG. 3 is a view showing a mechanism for a color compensation filter employed in the present invention.

The color compensation filter 3 is each provided with a mechanism as shown in FIG. 3, and each of the filters for cyan, magenta and yellow is configured in the same manner so that it will suffice to say that the cyan filter is designed as follows. The cyan filter 31 (hereinafter referred to as a "C-filter") consists of a pair of filter plates 311 and 312 each having two quarter segment filter means. The filter plates are opened and closed in the directions M1 and M2 by means of nut members 221A and 222A mounted on frames 311A and 312A of the filter plates 311 and 312. More specifically, the nut members 221A and 222A are screwed into a shaft 22 which is threaded at predetermined pitches in directions opposed to each other, forming screws 221 and 222. With this arrangement, the nut members 221A and 222A are moved in the direction of M1 or M2 by rotating the shaft 22 in the direction of N1 or N2, respectively. Slide members 23A and 23B are mounted on the frames 311A and 312A so as to slide on a guide rod arranged in parallel therewith. The shaft 22 is rotated by a servomotor 21 through a gear mechanism 21A. A potentiometer 24 is operatively coupled to the nut member 221A for detecting the extent to which the C-filter 31 has been opened. The filter plates 311 and 312 are adapted to define an optical path 35 at the centers thereof. The dimensions of the optical path 35 are adjusted by rotating the shaft 22 to move the nut members 221A and 222A in the directions M1 and M2. The filters for the other colors M and Y are designed in the same manner as in this C-filter 31 and are driven by a servomotor. The extent to which each filter has been opened is also detected by the potentiometer.

In the manner noted above, when the extent of insertion of the color compensation filter 3 into the optical path is adjusted, and the light quantity per unit area of the image sensor 11 is within a predetermined range, the storage time is re-set (Step S7) to the optimum storage time corresponding to the size of the film negative 2 as required so that image information on a frame image on the film negative that is fed to the top of the film negative carrier 9 may be measured (Step S8). Then, the exposure amount corresponding to the frame image on the film negative 2 is determined based on the measured value to effect photoprinting (Step S9). In photoprinting the film negative 2, the color compensation filter 3 adjusted in the Step S6 is automatically set to a photoprinting position that accords with the exposure amount determined in the Step S6.

The color compensation filter may be automatically moved to a predetermined position instead of repetition the Steps S4 to S6. A reference sensitivity is determined by means of a color filter, an ND filter and the like fixed in an optical system for an image detecting means. A combination system with this manner of arrangement may be employed to provide correspondence with the size of various film negatives. Although density has been explained above, the present invention may also be applied to the measurement of color luminous intensity with a stripe filter, a mosaic filter and a three color separation filter and the like closely attached to the sensor.

As noted above, according to the present method of measuring luminous intensity, the color compensation filter which has been conventionally used in photoprinting may be applied without any modification thereof to set the light quantity per unit area of the image sensor and the photosensor and the like in a predetermined range at any time so that accurate photo luminous intensity may be measured such as to effectively perform photoprinting. The photographic printer may be manufactured and fabricated in a simple manner and at a low cost since there is no need for any ND filter adjusting mechanism or aperture adjusting mechanism.

It should be understood that many modifications and adaptations of the invention will become apparent to those skilled in the art and it is intended to encompass such obvious modifications and changes in the scope of the claims appended hereto.

What is claimed is:

1. A photometering method in a photographic printer wherein color balance and density are adjusted by means of a color compensation filter and wherein a photoprint may be made by irradiating light on an original film through a mirror box, comprising the steps of: setting the color compensation filter to a photometering position so as to allow the light quantity per unit area of an image information detecting means comprising an image sensor to be within a predetermined area, photometering the original film by means of the image information detecting means, and then setting the color compensation filter to an exposure position for automatic photoprinting.

2. A photometering method in a photographic printer as set forth in claim 1, wherein the color compensation filter is automatically set to the photometering position before photometering the original film.

3. A photometering method in a photographic printer as set forth in claim 1, wherein the storage time of the image sensor is set to a predetermined value after exchanging the mirror box for another mirror box.

4. A photometering method in a photographic printer as set forth in claim 3, wherein the storage time of the image sensor is re-set after the color compensation filter is set to the photometering position.

5. A photometering method in a photographic printer as set forth in claim 4, wherein the image information on the original film is detected by the image sensor after the storage time is set so as to determine the exposure amount.

6. A photometering method in a photographic printer as set forth in claim 1, wherein the image sensor is a two-dimensional image sensor.

7. A photometering method in a photographic printer as set forth in claim 2, wherein the color compensation filter consists of three color filters.

* * * * *